United States Patent [19]

Adachi

[11] 4,373,424
[45] Feb. 15, 1983

[54] HYDRAULIC BOOSTER

[75] Inventor: Yoshiharu Adachi, Aichi, Japan

[73] Assignee: Aisin Seiki Kabushiki Kaisha, Aichi, Japan

[21] Appl. No.: 183,641

[22] Filed: Sep. 3, 1980

[30] Foreign Application Priority Data

Sep. 4, 1979 [JP] Japan ............................... 54-113812

[51] Int. Cl.³ .......................... F01B 25/02; F15B 9/10
[52] U.S. Cl. ......................................... 91/20; 91/31; 91/49; 91/431; 91/452
[58] Field of Search ................... 91/6, 31, 431, 5, 451, 91/452, 391 R, 20, 49

[56] References Cited

U.S. PATENT DOCUMENTS

| | | | |
|---|---|---|---|
| 3,633,462 | 1/1972 | Goscenski | 91/391 R |
| 3,712,176 | 1/1973 | Meyers | 91/6 |
| 3,926,210 | 12/1975 | Rasmussen | 91/451 |
| 4,075,848 | 2/1978 | Ueda | 91/31 |
| 4,135,435 | 1/1979 | Adachi | 91/431 |

Primary Examiner—Paul E. Maslousky
Attorney, Agent, or Firm—Oblon, Fisher, Spivak, McClelland & Maier

[57]         ABSTRACT

A hydraulic system in which pressurized fluid fed from a hydraulic pump is distributed through a distributor valve, on one part to a hydraulic booster for a brake and on the other part to a power steering unit or other hydraulic device. The distributor valve has a spool valve slidably fitted in a casing, the spool being displaced according to a fluid pressure differential acting at opposite ends thereof to increase the discharge pressure of the hydraulic pump in response to an increase in the fluid pressure at a first outlet port of the casing leading to the hydraulic booster or in the fluid pressure at a second outlet port leading to the power steering unit. Upon application of brake, a fluid passage which drains the first outlet port through a power piston is closed by movement of an input piston which is associated with a brake pedal, thereby slidingly displacing a valve piston. At this time, the discharge pressure of the hydraulic pump is increased and a third outlet port of the distributor valve is opened to admit the pressurized fluid from the hydraulic pump into a pressure chamber of the power piston through a valve which is opened by the displacement of the input piston for applying brake. An accumulator which is connected to the third outlet port of the distributor valve stores the pressurized fluid when the discharge pressure of the hydraulic pump is high, supplying the stored fluid to the pressure chamber of the power piston in the event of trouble with the pump or when a valve for the pressure chamber is opened.

9 Claims, 8 Drawing Figures

HYDRAULIC BOOSTER

BACKGROUND OF THE INVENTION

1. Field of the Invention

This invention relates generally to a hydraulic system in which a hydraulic booster and another hydraulically operating device receives pressurized fluid from a common hydraulic pump, and more particularly to a hydraulic booster which operates quickly in response to operations by a driver while preventing the pumping pulsations from being perceived by the driver.

2. Description of the Prior Art

A hydraulic booster of this class is disclosed, for example, in U.S. Pat. No. 4,075,848, patented Feb. 28, 1978 in which the pressurized fluid from a hydraulic pump is apportioned to two circuits by a distributor valve, one circuit leading to a reservoir through a pressure chamber of a hydraulic booster and a normally open valve operated by a driver and the other leading to the reservoir through another hydraulically operating device such as a power steering unit. The system further includes a change-over valve which is associated with the input piston of a normally open valve and adapted to elevate the discharge pressure of the oil pump to a level considerably higher than that of the aforementioned pressure chamber at the time of boosting operation by restricting the flow of fluid from the distributor valve to the pressure chamber, and a normally closed valve which is opened to admit the discharge pressure of the oil pump into the pressure chamber after the normally open valve is completely closed.

SUMMARY OF THE INVENTION

It is a primary object of the present invention to provide a hydraulic booster of a simplified construction employing a distributor valve which is provided with an additional land for elevating the discharge pressure of the oil pump at the time of the boosting operation to a level appreciably higher than the booster operating pressure, without resorting to the above-mentioned change-over valve.

According to the present invention, there is provided a hydraulic booster, including in combination: a hydraulic pump; a distributor valve casing having an inlet port supplied with the discharge pressure of the pump and first and second outlet ports; a spool valve slidably fitted in the distributor valve casing and having, in addition to lands for controlling the flows of pressurized fluid from the inlet port to the first and second outlet ports in response to pressure variations at the first and second outlet ports, a land for raising the discharge pressure of the hydraulic pump to a level considerably higher than the pressure at the first outlet port in response to a pressure increase at the first outlet port; a cylinder body having a first inlet port communicating with the first outlet port of the distributor valve casing, a second inlet port supplied with the discharge pressure of the hydraulic pump and an outlet communicating with a reservoir; a power piston slidably fitted in the cylinder body and defining therein a pressure chamber and a drain chamber respectively communicating with the first inlet port and outlet of the cylinder body; a valve member slidably mounted in the power piston; a normally open valve constituted by the valve member and an input piston which is operated by a driver; a passage communicating the pressure and drain chambers with each other through the normally open valve; a normally closed valve provided provided within the power piston and adapted to be opened by the input piston through the valve member when the normally open valve is completely closed; a passage communicating with the second inlet port and the pressure chamber with each other through the normally closed valve and an output rod connected to the power piston.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Figure 1:
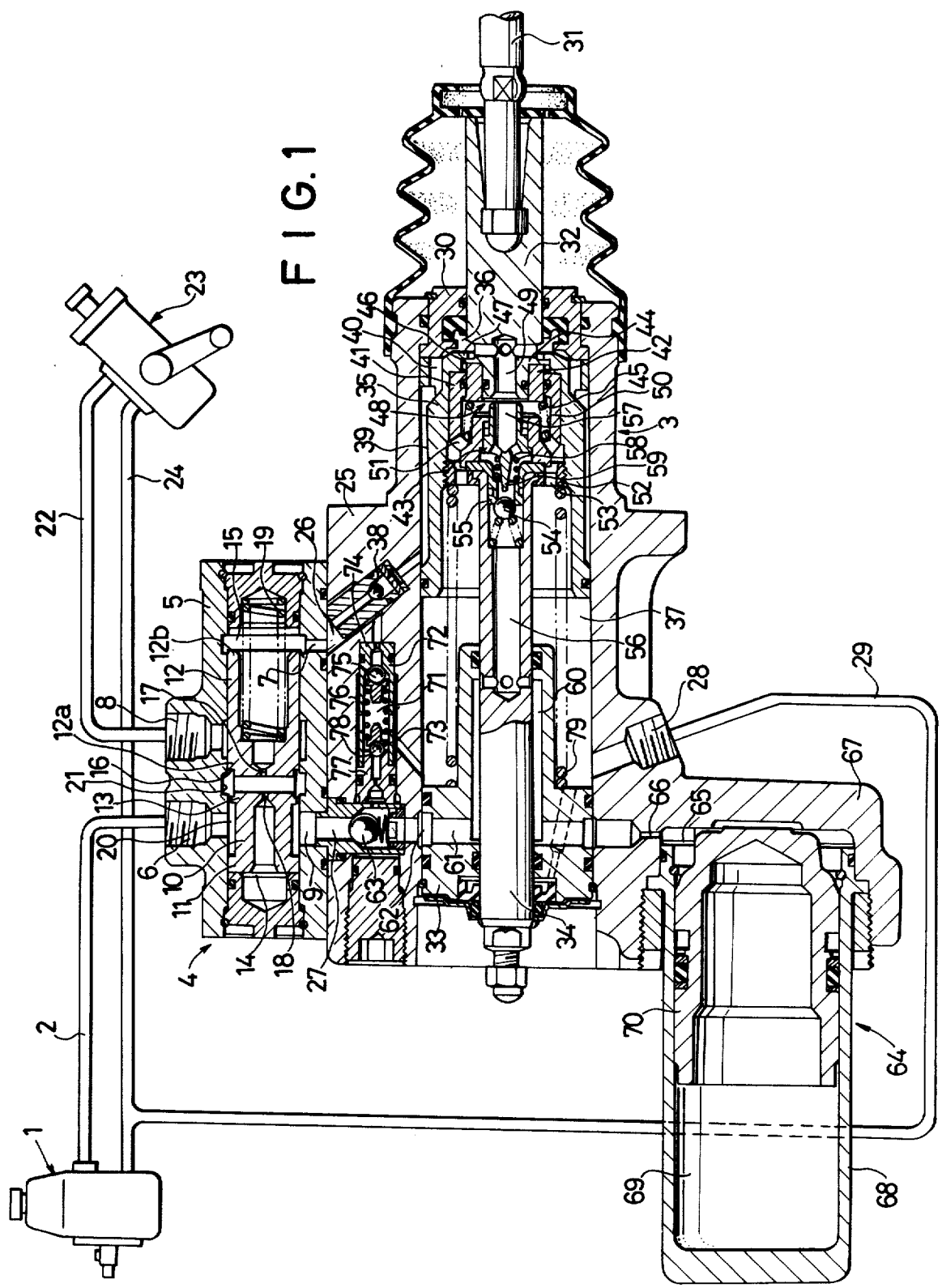
FIG. 1 is a diagrammatic sectional view of an embodiment of the present invention.

Referring to the accompanying drawings and first to FIG. 1, indicated by reference numeral 1 is an oil pump with a reservoir which is driven for example by the engine of a motor vehicle. The oil pressure delivered by the pump 1 is fed to an inlet port 6 in a casing 5 of a distributor valve 4 of a hydraulic booster 3 for a brake.

The casing 5 of the distributor valve 4 is provided with a first outlet port 7, a second outlet port 8 and a third outlet port 9 and slidably receives therein a spool valve 10 for controlling flow quantity rates of oil from the inlet port 6 to the first and second outlet ports 7 and 8. The spool 10 is provided with lands 11 and 12 of a larger diameter and a land 13 of a smaller diameter. One larger land 11 defines a first pressure chamber 14 within the casing 5 while the other larger land 12 defines a second pressure chamber 15 within the casing 5. The left-hand shoulder portion 12a of the land 12 controls the area of a flow passage from an annular groove 16 to the second outlet port 8 and the right-hand shoulder portion 12b controls the area of a flow passage from the second pressure chamber 15 to the first outlet port 7. The second pressure chamber 15 receives oil pressure from the annular groove 16 through an orifice 17 which is formed in the spool 10. The pressure on the upstream side of the orifice 17 is led to the first pressure chamber 14 through an attenuation orifice 18 which is formed in the spool 10. Therefore, the spool 10 is pushed to the left or right by a force corresponding to the difference between the pressures prevailing in the first and second pressure chambers 14 and 15, namely, between the pressures on the upstream and downstream sides of the orifice 17.

A spring 19 is provided in the second pressure chamber 15 to urge the spool 10 toward the first pressure chamber 14, holding the spool 10 in the leftmost rest position (FIG. 1) when the oil pump 1 is at rest. Prior to the boosting operation by the booster 3, the smaller land 13 of the spool 10 constricts the flow of oil to the annular groove 16 from an annular groove 20 which freely communicates the inlet port 6 with the third outlet port 9 to thereby raise the discharge pressure of the pump 1. An annular groove 21 is formed on the casing 5 in order to prevent the oil flow from the annular groove 20 to the annular groove 16 from being constricted by the smaller land 13 when the booster 3 is not in operation.

Except the third outlet port 9 and the annular groove 21 of the valve casing 5, and the smaller land 13 on the spool 10, the distributor valve 4 of the above-described construction is known as a constant flow type distributor valve in which the supply of oil to the inlet port 6 is apportioned to the first outlet port 7 in a constant quantity of flow and to the second outlet port 8 in the remaining quantity of flow. The pressurized oil which flows out of the second outlet port 8 of the distributor valve 4 is fed to a power steering unit 23 through a pipe 22 and then returned to the reservoir of the oil pump 1 through a pipe 24.

Cylinder body 25 of the booster 3 has a first inlet port 26 which communicates with the first outlet port 7 of the distributor valve 4, a second inlet port 27 which communicates with the third outlet port 9 of the distributor valve 4, and an outlet port 28 which communicates with the reservoir of the pump 1 through a conduit 29. A guide member 30 which is fixedly fitted in the opening at the right-hand end of the cylinder body 25 slidably supports an input piston 32 which is linked to the brake pedal through a push rod 31. On the other hand, a guide member 33 which is fixedly fitted in the opening at the left-hand end of the cylinder body 25 slidably supports an output rod 34 which operates a brake master cylinder. A power piston 35 is slidably received in the cylinder 25. defining a pressure chamber 36 and a drain chamber 37 respectively in the right and left end portions of the cylinder body 25. The oil at the first inlet port 26 is admitted into the pressure chamber 36 via a check valve 38, an annular groove 39 on the outer periphery of the power piston 35 and a bore 40 formed in the power piston 35. A guide member 41 which is fixedly fitted in the power piston 35 slidably supports an annular member 42 and a movable valve member 42. Annular member 43 is slidably fitted on the outer periphery of a smaller diameter portion 44 at the left end of the input piston 32 and biased to the right by a spring 45. Input piston 32 is provided with a flange 46 on its outer periphery, which is engageable with a flange 47 on the power piston 35 to thereby limit the rightward movement of the input piston 32 relative to the power piston 35 within a predetermined distance.

When the brake pedal is in released state, the right end face of the annular member 42 abuts against the input piston 32 to transmit thereto the force of the spring 45. The left end of the input piston 32 and the movable valve member 43 constitute a normally open valve 48 so that the oil in the pressure chamber 36 is allowed to flow into the drain chamber 37 through a passage 49 formed in the input piston 32, the normally open valve 48, a passage 50 in the guide member 41, a bore 51 formed in the guide member 41 and a bore 53 formed in a nut 52. Nut 52 is threaded into the power piston 35 to fix the guide member 41, the right end of an output rod 34, and a valve seat 55 of a normally closed valve 54 to the power piston 35. The normally closed valve 54 is located in the right end portion of a passage 56 which is formed in the output rod 34. The movable valve member 43 which constitutes the normally open valve 48 is provided with a passage 57 which communi- cates the normally closed valve 54 with the passage 49 of the input piston 32 and with a push rod 59 which pushes and opens the normally closed valve 54 when the movable valve member 43 is pushed by the input piston 32 against the spring 58 (with the normally open valve 48 completely closed). Passage 56 in the output rod 34 communicates with an annular groove 62 on the outer periphery of the guide member 33 through an annular groove 60 on the inner periphery of the guide member 33 and a passage 61 formed in the guide member 33. The annular groove 62 is connected to the second inlet port 27 through a check valve 63 to let the oil flow from the second inlet port 27 through a check valve 63 to let the oil flow from the second inlet 27 into the annular groove 62 when the pressure at the second inlet port 27 is higher than the pressure in the annular groove 62. The annular groove 62 also communicates with a storage chamber 65 of an accumulator 64 through an orifice 66. The casing 68 of the accumulator 64 is secured to an extended part 67 of the cylinder body 25 and slidably receives a piston 70 which defines a pressurized gas chamber 69 and an oil storage chamber 65 on opposite sides thereof.

A cavity 71 is provided in the upper portion of the cylinder body 25, which cavity communicates with the first inlet port 26, annular groove 62 and drain chamber 37 in its right end, left end and middle portions, respectively. A relief valve 72 is located in the right end portion of the cavity 71 to prevent the pressure in the pressure chamber 36 from rising over a predetermined level. Another relief valve 73 is seated in the left end portion of the cavity 71 to prevent the pressure in the oil storage chamber 65 of the accumulator 64 from increasing to an abnormally high level. A spherical valve body 75 of the relief valve 72 is urged to seat on its seat 74 by a spring 76 which also serves to urge a similarly spherical valve body 78 of the relief valve 73 toward its seat 77. This arrangement aims at the reduction in the number of component parts and in providing space for accommodating the two relief valves 72 and 73. The difference between the opening pressures of the two relief valves 72 and 73 is determined by the difference in effective diameter between the respective valve seats 74 and 77. For example, in a case where it is desired to open the relieve valves 72 and 73 at 60 kg/cm$^2$ and 120 kg/cm$^2$, respectively, the effective diameter of the valve seat 74 is set at $\sqrt{2}$ times that of the valve seat 77.

The hydraulic booster of the above construction operates in the following manner.

Figure 2:
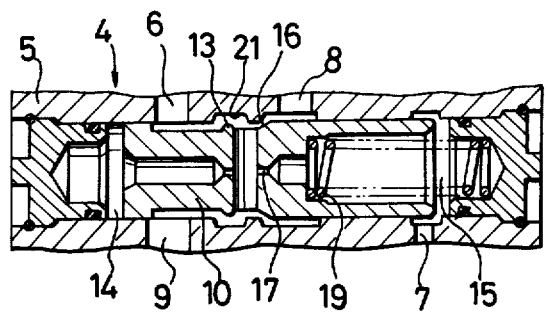
FIGS. 2 to 4 are diagrammatic sectional views showing the operations of the distributor valve of FIG. 1.

When the brake pedal and steering handle are not in operation, the first outlet port 7 of the distributor valve 4 of the hydraulic booster 3 communicates with the reservoir of the oil pump 1 via first inlet port 26 of the cylinder body 25, check valve 38, annular groove 39, bore 40, pressure chamber 36, passage 49, normally open valve 48, passage 50, bore 51, bore 53, drain chamber 37, outlet 28 and pipe 29. Similarly, the second outlet port 8 of the distributor valve 4 communicates with the reservoir of the oil pump 1 via pipe 22, power steering unit 28, and pipe 24. If the oil pump 1 is started under these circumstances, the oil delivered to the inlet port 6 from the pump 1 flows to the first outlet port 7 through the annular groove 20, the clearance around the outer periphery of the smaller land 13, annular groove 16, orifice 17 and second pressure chamber 15. At this time, the pressure in the first pressure chamber 14 is increased due to the constricting effect of the orifice 17 and causes movement of the spool 10 to the position of FIG. 2 against the force of the spring 19. In the position of FIG. 2 the annular groove 16 communicates with the second outlet port 8, thus allowing the oil to flow from the annular groove 16 to the second outlet port 8. In this instance, the flow from the annular groove 16 to the second outlet port 8 and the flow from the second pressure chamber 15 to the first outlet port 7 take place in a slightly constricted state, and the spool 10 is moved in either direction according to pressure variations in the first and second pressure chambers 14 and 15 resulting from variations in the discharge rate of the oil pump 1, thereby contrastingly varying the constrictions on the flow from the annular groove 16 to the second outlet port 8 and the flow from the second pressure chamber 15 to the first outlet port 7 to maintain the pressure differential between the two pressure chambers 14 and 15 at a preset value balancing with the force of the spring 19. Thus, the flow of oil to the first outlet port 7 is maintained at a constant rate.

Figure 3:
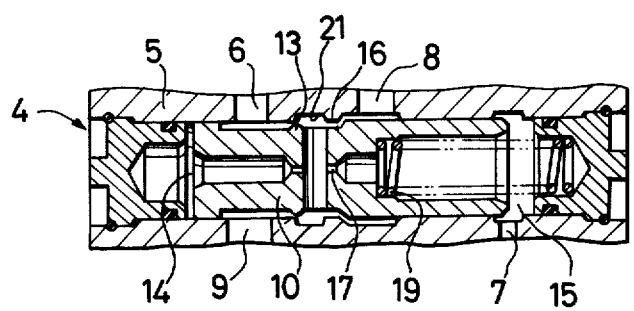

Upon stepping on the brake pedal, the input piston 32 slides to the left in FIG. 1 and causes closing of the normally open valve 48 to block communication of the pressure chamber 36 with the drain chamber 37. Then, the movable valve member 43 is pushed leftward by the input piston 32 to open the normally closed valve 54. As described hereinbefore, the closing of the normally open valve 48 causes increases in the pressure in the pressure chamber 36 and thus in the pressure in the second pressure chamber 15 of the distributor valve 4. As a result, the spool 10 of the distributor valve 4 slides toward the position of FIG. 3 to constrict in an increasing degree the flow of oil from the annular groove 16 to the second outlet port 8, increasing the pressure in the first pressure chamber 14. In the position of FIG. 3, the smaller land 13 of the spool 10 constricts the flow of oil from the annular groove 20 to the annular groove 16 to increase the pressure of oil delivered from the oil pump 1.

As is clear from the foregoing description, the normally open valve 48 is closed upon stepping on the brake pedal and the flow of oil from the inlet port 6 to the first and second outlet ports 7 and 8 is constricted by the distributor valve 4 so as to increase the pressure of oil delivered from the pump 1, so that, when the normally open valve 48 is closed completely, the normally closed valve 54 is opened to let the oil at the third outlet port 9 of the distributor valve 4 flow into the pressure chamber 36 via check valve 63, annular groove 62, passage 61, annular groove 60, passage 56, normally closed valve 54, passage 57 in the movable valve member 43 and passage 49. As a result, the pressure in the pressure chamber 36 is quickly increased and the power piston 35 slides leftward against the force of the return spring 79 according to the pressure increase in the pressure chamber 36 to operate the brake master cylinder through the output rod 34.

Figure 5:
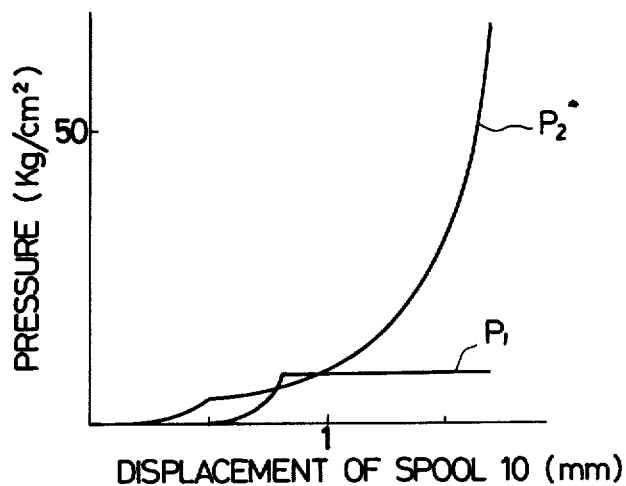
FIGS. 5 and 6 are graphic representations of the operations performed by the embodiment of FIG. 1.
Figure 6:
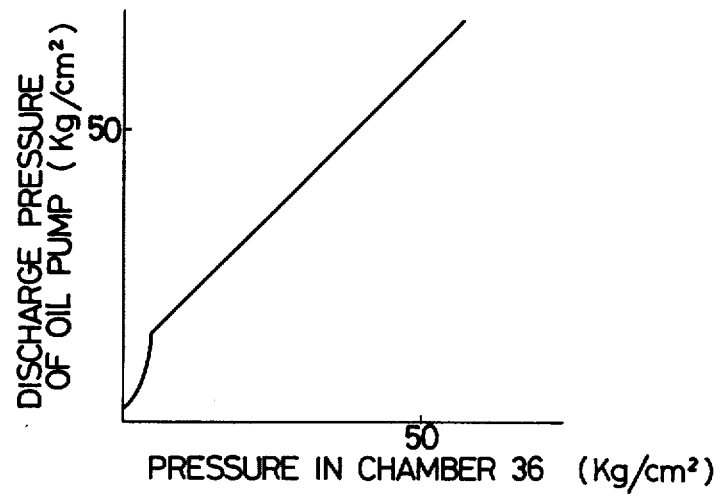

FIG. 5 graphically illustrates the pressure differential $P_1$ between the annular grooves 20 and 16 and the pressure differential $P_2$ between the annular groove 16 and the second outlet port 8 which take place when the spool 10 of the distributor valve 4 slides leftward as shown in FIG. 3 from the position of FIG. 2. FIG. 6 is a graphic representation of the relation between the pressures in the pressure chamber 36 and the annular groove 20 (discharge pressure of oil pump 1). The value of $P_1$ is determined by the extent of constriction by the land 13 and is thus arbitrarily selectable.

When the pressure in the pressure chamber 36 is increased in the above-described manner, the pressure in the pressure chamber 36 acts to push the input piston 32 rightward, generating a brake pedal reaction. If the brake pedal reaction overcomes the stepping force on the brake pedal, the input piston 32 is pushed rightward in relation to the power piston 35 to close the normally closed valve 54 and open the normally open valve 48, thereby eliminating the pressure increase in the pressure chamber 36. After this, the pressure in the pressure chamber 36 is maintained at a level responsive to the stepping force on the brake pedal by the movement of the input piston 32 which constricts the flow of oil from the pressure chamber 36 to the drain chamber 37 via normally open valve 48 in such a manner that the brake stepping force is balanced with the brake pedal reaction.

When the pressure in the pressure chamber 36 is controlled by the normally open valve 48, it is increased in response to increases in the stepping force on the brake pedal but its increase beyond the preset relief pressure is prevented by the operation of the relief valve 72. The limitation of the maximum pressure in the pressure chamber 35 prevents the flow of oil to the second outlet port 8 from being blocked by the spool 10, to permit the operation of the power steering unit 23.

When the brake pedal is released, the input piston 32 is pushed to the right in relation to the power piston 35 by the pressure in the pressure chamber 36, whereupon the normally open valve 48 is fully opened, draining the pressurized oil in the pressure chamber 36 quickly into the drain chamber 37 via normally open valve 48. As a result, the pressure in the pressure chamber 36 is dropped and the power piston 36 is returned to the illustrated original position by the force of the return spring 79.

Figure 4:
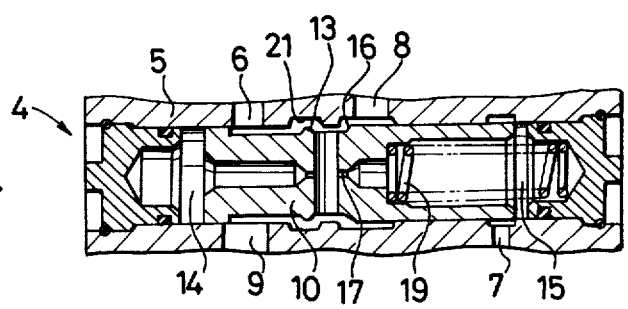

If the power steering unit 23 is operated while the booster 3 is not under boosting operation, the pressure at the second outlet port 8 of the distributor valve 4 is increased by the operation of the power steering unit 23 with corresponding increases in the discharge pressure of the oil pump 1 and the pressure in the first pressure chamber 14 so that the spool 10 is displaced from the position of FIG. 2 to the position of FIG. 4 to increase the pressure of the second pressure chamber 15 by constricting the flow of oil to the first outlet port 7 from the second pressure chamber 15. In the position of FIG. 4, the second outlet port 8 freely communicates with the inlet port 6 and the discharge pressure of the oil pump 1 is maintained at the operating pressure of the power steering unit 23.

If the brake pedal is stepped on while the discharge pressure of the oil pump 1 is in an elevated state due to the operation of the power steering unit 23 as mentioned above, the normally open valve 48 is completely closed and then the normally closed valve 54 is opened, whereupon the oil at the second outlet port 9 of the distributor valve 4 rushes into the pressure chamber 36 through the normally closing valve 54, quickly increasing the pressure of the pressure chamber 36.

The accumulator 64 stores the pressurized working oil in the storage chamber 65 when the discharge pressure of the oil pump 1 exceeds the pressure of the storage chamber 65 due to operations of the booster 3 and/or power steering unit 23 with the normally closed valve 54 in the closed position, supplying the stored oil to the pressure chamber 36 in the event of trouble with the oil pump 1 or when the normally closed valve 54 is opened during normal operation of the oil pump 1. The relief valve 73 relieves the pressure of the accumulator 64 when it is abnormally increased, for example, due to expansion of the gas in the sealed gas chamber 69 in an accidental fire or for other reasons, thereby preventing explosion of the accumulator 64.

Figure 8:
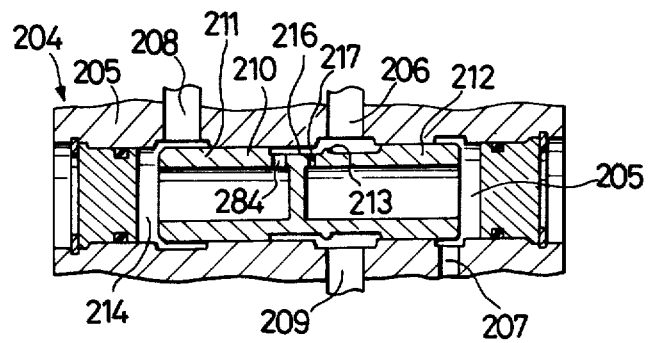
FIG. 8 is a diagrammatic sectional view of another modified distributor valve.
Figure 7:
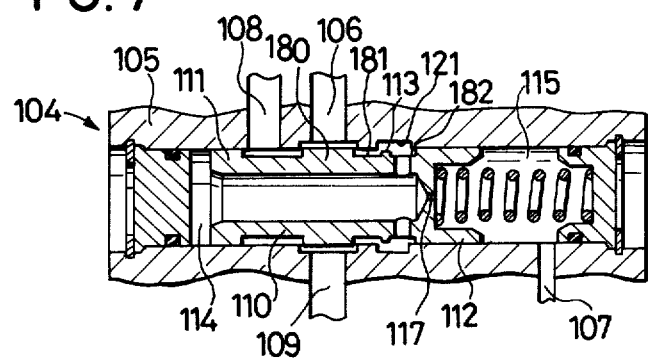
FIG. 7 is a diagrammatic sectional view of a distributor valve of a modified construction.

FIGS. 7 and 8 illustrate additional embodiments of the distributor valve which constitutes an essential part of the present invention. The distributor valve 104 of FIG. 7 is a modification of a constant flow control type distributor valve, in which similarly a valve casing 105 is provided with an inlet port 106, a first outlet port 107, a second outlet port 108 and a third outlet port 109, and the spool valve 110 is provided with three larger-diameter lands 111, 112 and 180 and one smaller-diameter land 113. The flow of oil from the inlet port 106 to the first outlet port 107 takes place via annular groove 181, clearance around the outer periphery of the smaller land 113, annular groove 182, first pressure chamber 115, so that the pressures on the upstream and downstream sides of the orifice 117 prevail in the first and second pressure chambers 114 and 115, respectively. The spool 110 slides in either direction by the leftward pushing force of a spring 119 in the second pressure chamber 115 and the rightward pushing force exerted according to the pressure differential between the pressures upstream and downstream of the orifice 117. The inlet port 106, first outlet port 107, second outlet port 108 and third outlet port 109 of the valve casing 105 are connected with the oil pump, hydraulic booster and power steering unit in the same manner as in the above-described distributor valve 4. The spool 110 of FIG. 7 is in a rest position which is assumed when both the hydraulic booster and power steering unit are not in operation, the smaller land 113 being located on the inner side of the annular groove 121 on the valve casing 105.

When the pressure at the second outlet port 108 is increased by operation of the power steering unit, the resultant pressure is prevented from being transmitted to the first pressure chamber 114 where the spool 110 is moved rightward from the position of FIG. 7 to constrict the flow of oil from the inlet port 106 to the annular groove 181 at the right-hand shoulder portion of the larger land 180 so as to prevent increase of the discharge pressure of the oil pump. On the other hand, in the case where the pressure at the first outlet port 107 is moved left from the position of FIG. 7 to prevent reduction in the flow quantity rate to the first outlet port 107 due to the resultant increase in the pressure of the second pressure chamber 115, increasing the pressure of the first pressure chamber 114 by constricting the flow of oil from the inlet port 106 to the second outlet port 108 at the left-hand shoulder portion of the larger land 180, at the same time constricting the flow of oil from the annular groove 181 to the annular groove 182 by the smaller land 113. Therefore, when the booster is in operation, the flow of oil from the inlet port 106 to the first and second outlet ports 107 and 108 is constricted, increasing the discharge pressure of the oil pump to a level appreciably higher than the pressure at the first outlet port 107.

The construction of the distributor valve 104 of FIG. 7 is known in the art except for the third outlet port 109, smaller land 113 and annular groove 121.

The distributor valve 204 of FIG. 8 is a modification of a constant ratio type distributor valve which delivers the pressurized oil at the first and second outlet ports 207 and 108 of a valve casing 205 in a constant ratio. An inlet port 206, a first outlet port 207, a second outlet port 208 and a third outlet port 209 of the valve casing 205 are connected with the oil pump, hydraulic booster and power steering unit in the same manner as in the above-described distributor valves 4 and 104.

A spool valve 210 is provided with larger-diameter lands 211 and 212 and a smaller-diameter land 213 which controls the flow of oil from the inlet port 206 to an annular groove 216. The oil in the annular groove 216 flows into the first outlet port 207 through an orifice 217 and second pressure chamber 215 and to the second outlet port 208 through an orifice 284 and first pressure chamber 214. The spool 210 slides in either direction according to the pressure differential between the first and second pressure chambers 214 and 215, the sliding movements of the spool 210 contrastingly constricting the flow from the first pressure chamber 214 to the second outlet port 208 and the flow from the second pressure chamber 215 to the first outlet port 207 in a manner to equalize the pressures in the first and second pressure chambers 214 and 215. With this arrangement, the pressure on the upstream and downstream sides of the orifice 217 respectively correspond to the pressure on the upstream and downstream sides of the orifice 284, so that the oil is delivered to the first and second outlet ports 207 and 208 according to the ratio of the dimensions of the orifices 217 and 284. Spool 210 is shown in a rest position in which the power steering unit and hydraulic booster are not in operation. When the pressure at the second outlet port 208 is increased by operation of the power steering unit, the spool 210 slides rightward from the position of FIG. 8 by the resultant pressure increase in the first pressure chamber 214 thereby constricting the flow of oil from the second pressure chamber 215 to the first outlet port 207 to increase the pressure of the second pressure chamber 215. On the other hand, when the pressure at the first outlet port 207 is increased by operation of the booster, the spool 210 slides leftward from the position of FIG. 8 by the resultant pressure increase in the second pressure chamber 215 thereby constricting the flow of oil from the first pressure chamber 214 to the second outlet port 208 to increase the pressure of the first pressure chamber 214. At the same time, the flow of oil from the inlet port 206 to the annular groove 216 is constricted by the smaller land 213 to increase the discharge pressure of the oil pump to a level appreciably higher than the pressure at the first outlet port 207.

The third outlet port of the above-described distributor valve 4, 104 and 204 serves to communicate the second inlet port of the booster 3 with the discharge side of the oil pump and therefore becomes unnecessary in the case where the second inlet port of the booster communicates with a conduit which is connected between the oil pump and the distributor valve.

As clear from the foregoing description, the present invention makes it possible to increase the discharge pressure of the oil pump at the time of boosting operation of the hydraulic booster by providing an additional land on the distributor valve spool which is displaced by the operation of the booster.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A hydraulic booster, comprising:
   a hydraulic pump for producing a fluid discharge pressure;
   a distributor valve casing having first and second outlet ports and an inlet port for receiving pressurized fluid from said pump;
   a spool valve slidably fitted in said valve casing and comprising first and second lands for controlling the flow of fluid from said inlet port to said first and second outlet ports in a predetermined manner in response to pressure variations at said first and second outlet ports and a third land for raising the discharge pressure of said pump to a level considerably higher than the pressure at said first outlet port in response to a pressure increase at said first outlet port;
   a cylinder body having a first inlet port communicating with said first outlet port of said distributor valve casing, a second inlet port supplied with the discharge pressure of said pump and an outlet communicating with a reservoir;
   a power piston slidably fitted in said cylinder body and defining therein a pressure chamber and a drain chamber respectively communicating with said first inlet port and outlet of said cylinder body;
   a valve member slidably mounted in said power piston;
   a normally open valve including said valve member and further comprising an input piston which is operated by a driver;
   passage means communicating said pressure and drain chambers with each other through said normally open valve;
   a normally closed valve disposed within said power piston and adapted to be opened by said input piston through said valve member when said normally open valve is completely closed;
   passage means communicating said second inlet port and said pressure chamber with each other through said normally closed valve; and an output rod connected to said power piston.

2. A hydraulic booster according to claim 1, said valve casing including an inner cylindrical wall having an annular groove formed therein wherein the first and second lands are disposed at opposite ends of the spool for controlling the flow of fluid from the first and second outlet ports in the predetermined manner in response to pressure variations, the third land having a smaller diameter than the first and second lands and being disposed at the opposing position with respect to said annular groove whereby the third land constricts the flow of fluid in cooperation with said annular groove for raising the discharge pressure of the pump in response to a pressure increase at the first outlet port.

3. A hydraulic booster according to claim 1, said cylinder body having a cavity formed therein to communicate the drain chamber with the first inlet port and further comprising a relief valve disposed in the cavity for preventing the pressure in the pressure chamber from rising over a predetermined level.

4. A hydraulic booster according to claim 1, further comprising:
   an accumulator;
   said passage means communicating the second inlet port with the pressure chamber of the cylinder body further comprising means for communicating with said accumulator; and
   a check valve disposed in the second inlet port to allow pressurized fluid to flow into the accumulator through the second inlet port and to prevent pressurized fluid from flowing into the distributor valve casing through said second inlet port.

5. A hydraulic booster according to claim 4, the cylinder body including a cavity formed therein to communicate the drain chamber with the second inlet port, and a relief valve disposed in the cavity to allow fluid flow from the second inlet port into the drain chamber for preventing the pressure in the accumulator from increasing to an abnormally high level.

6. A hydraulic booster according to claim 4, the cylinder body including a cavity formed therein which is in communication with the drain chamber at a center portion thereof and with the first and second inlet ports of the cylinder body at both ends thereof respectively, and further comprising:
   first and second relief valves including a spherical valve body respectively disposed on each end of said cavity;
   spring means disposed in the cavity to urge said valve bodies so as to be seated at both ends thereof respectively, whereby the first relief valve allows fluid flow from the pressure chamber into the first inlet port for preventing the pressure in the pressure chamber from rising above a predetermined level and the second relief valve allows fluid flow from the second inlet port into the drain chamber for preventing the pressure in the accumulator from increasing to an abnormally high level.

7. A hydraulic booster, comprising:
   a hydraulic pump for producing a fluid discharge pressure;
   a distributor valve casing having first and second outlet ports and an inlet port for receiving pressurized fluid from said pump;
   a spool valve slidably fitted in said valve casing and comprising first and second lands for controlling the flow of fluid from said inlet port to said first and second outlet ports in a predetermined manner in response to pressure variations at said first and second outlet ports and a third land for raising the discharge pressure of said pump to a level considerably higher than the pressure at said first outlet port in response to a pressure increase at said first outlet port;
   a cylinder body having a first inlet port communicating with said first outlet port of said distributor valve casing, a second inlet port supplied with the discharge pressure of said pump and an outlet communicating with a reservoir;
   a power piston slidably fitted in said cylinder body and defining therein a pressure chamber and a drain chamber respectively communicating with said first inlet port and outlet of said cylinder body;
   a valve member slidably mounted in said power piston;
   a normally open valve including said valve member and further comprising an input piston which is operated by a driver;
   first passage means communicating said pressure and drain chambers with each other through said normally open valve;
   a normally closed valve disposed within said power piston and adapted to be opened by said input piston through said valve member when said normally open valve is completely closed;

second passage means communicating said second inlet port and said pressure chamber with each other through said normally closed valve, said second passage means further comprising an annular groove formed in said cylinder body;

an accumulator fluidly communicating with said annular groove formed in said cylinder body, wherein said cylinder body further comprises a cavity formed therein for communicating said drain chamber with said first inlet port and for communicating said annular groove formed in said cylinder body with said drain chamber; and an output rod connected to said power piston.

8. A hydraulic booster according to claim 7 further comprising:

a first relief valve disposed in said cavity in said cylinder body for preventing pressure in said pressure chamber from rising over a first predetermined value; and a second relief valve disposed in said cavity in said cylinder body for preventing pressure in said accumulator from rising over a second predetermined value.

9. A hydraulic booster according to claim 8 further comprising:

a single spring means disposed in said cavity in said cylinder body for simultaneously biassing said first and said second relief valves in a closed seated position.

* * * * *